US00RE45712E

(19) United States
(12) Reissued Patent
Ogura et al.

(10) Patent Number: US RE45,712 E
(45) Date of Reissued Patent: Oct. 6, 2015

(54) SIGNAL CONVERSION DEVICE

(71) Applicant: Photonics Electronics Technology Research Association (PETRA), Tokyo (JP)

(72) Inventors: Ichiro Ogura, Tokyo (JP); Koichi Takemura, Tokyo (JP)

(73) Assignee: Photonics Electronics Technology Research Association (PETRA), Tokyo (JP)

(21) Appl. No.: 29/474,434

(22) Filed: Sep. 18, 2014

Related U.S. Patent Documents

Reissue of:
(64) Patent No.: Des. 706,733
Issued: Jun. 10, 2014
Appl. No.: 29/467,178
Filed: Sep. 16, 2013

(30) Foreign Application Priority Data

Mar. 18, 2013 (JP) ..... 2013-005942

(51) LOC (10) Cl. ..... 13-03
(52) U.S. Cl.
USPC ..... D13/182
(58) Field of Classification Search
USPC ..... D13/182; D9/432; 428/690; D21/500; D25/113
CPC ..... G01J 1/44; G01J 1/46; G01J 1/42; G01J 1/10; H03M 1/00; H03M 1/001; H03M 1/02; H03M 1/004; H03M 1/008; H03M 1/005
See application file for complete search history.

(56) References Cited

U.S. PATENT DOCUMENTS

D138,413 S * 8/1944 Powers ..... D9/430
3,497,750 A * 2/1970 Knochel et al. ..... 313/503
D333,615 S * 3/1993 Zutler ..... D3/294
5,565,656 A * 10/1996 Mottahed ..... 174/372
D456,787 S * 5/2002 Wasada et al. ..... D13/182
D461,171 S * 8/2002 Fukumoto et al. ..... D13/182
D465,463 S * 11/2002 Wasada et al. ..... D13/182
D465,773 S * 11/2002 Fukumoto et al. ..... D13/182
D475,028 S * 5/2003 Hori et al. ..... D13/182
D475,355 S * 6/2003 Hori et al. ..... D13/182
D475,982 S * 6/2003 Hori et al. ..... D13/182
6,709,278 B2 * 3/2004 Liu ..... 439/67
6,853,086 B1 * 2/2005 Nakayama ..... 257/778
D504,874 S * 5/2005 Celaya et al. ..... D13/182
D510,728 S * 10/2005 Celaya et al. ..... D13/182
7,350,326 B2 * 4/2008 Hu ..... 40/544

(Continued)

OTHER PUBLICATIONS

Notice of Allowance mailed Jan. 21, 2014 in U.S. Appl. No. 29/467,178, 10 pages.

*Primary Examiner* — Phillip S Hyder
(74) *Attorney, Agent, or Firm* — Kilpatrick Townsend & Stockton LLP

(57) CLAIM

The ornamental design for a signal conversion device, as shown and described.

DESCRIPTION

FIG. 1 is a front elevation view of a signal conversion device showing our new design;
FIG. 2 is a top plan view thereof;
FIG. 3 is a rear elevation view thereof;
FIG. 4 is a bottom plan view thereof;
FIG. 5 is a right side elevation view thereof;
FIG. 6 is a left side view elevation thereof; and,
FIG. 7 is a top, perspective view thereof.

1 Claim, 4 Drawing Sheets

Figure 1:
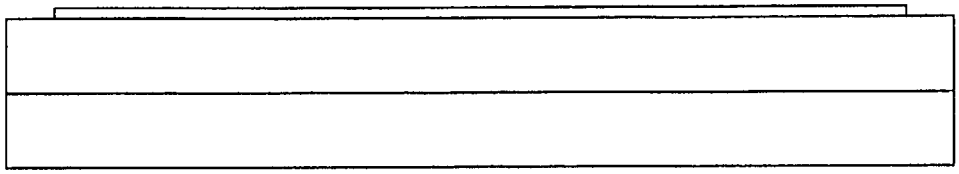
Figure 2:
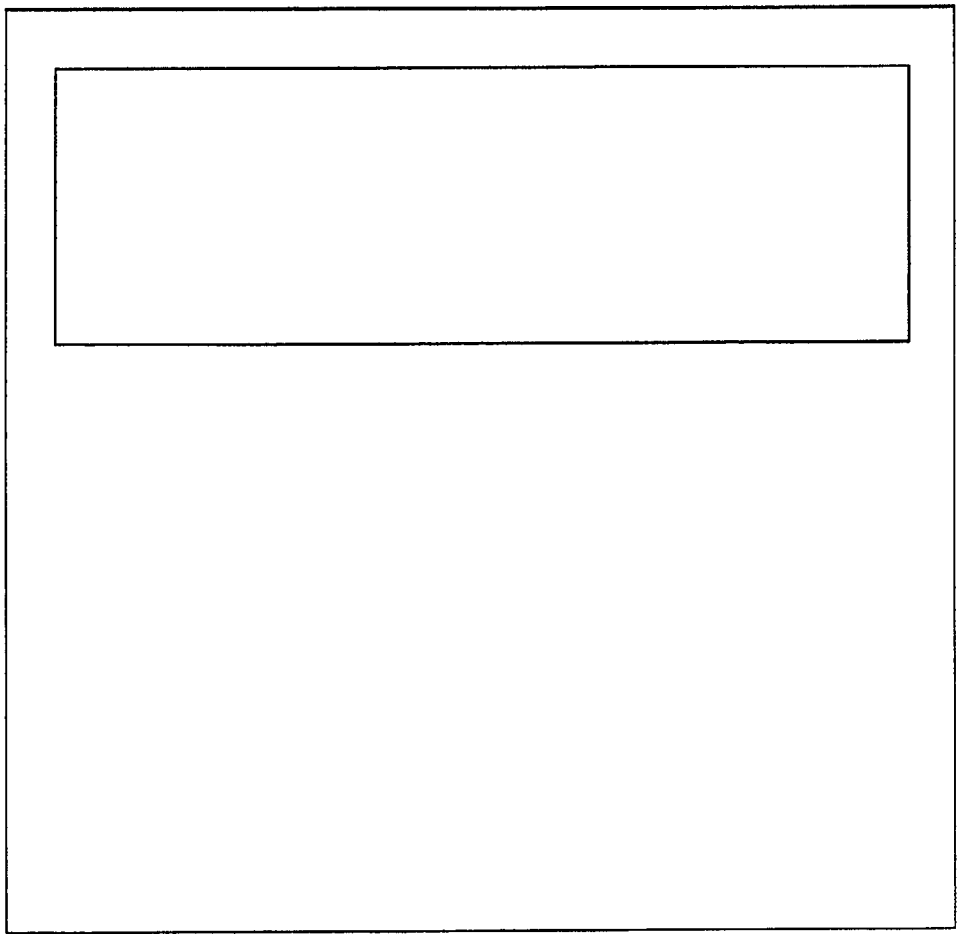
Figure 3:
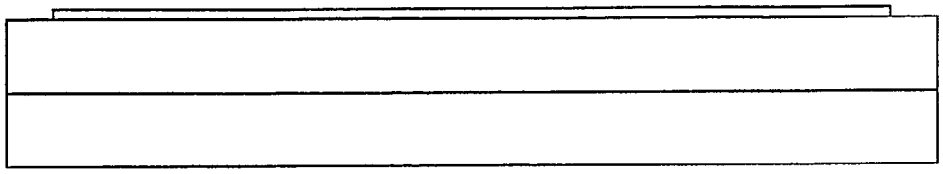
Figure 4:
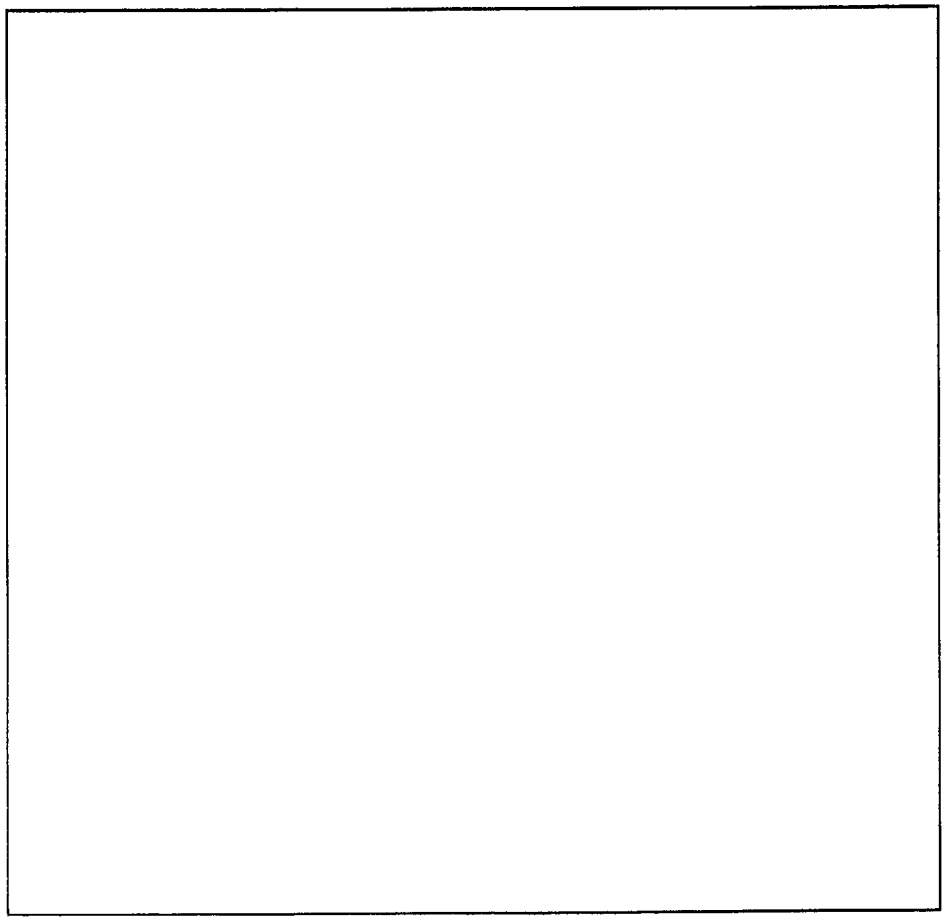
Figure 5:
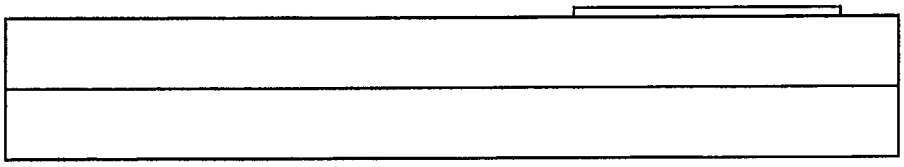
Figure 6:
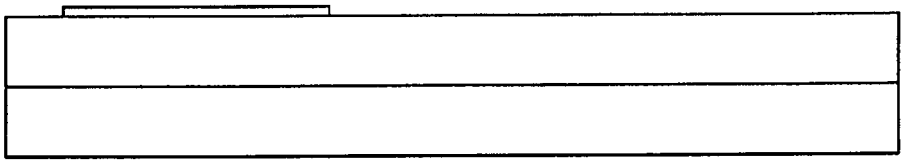
Figure 7:
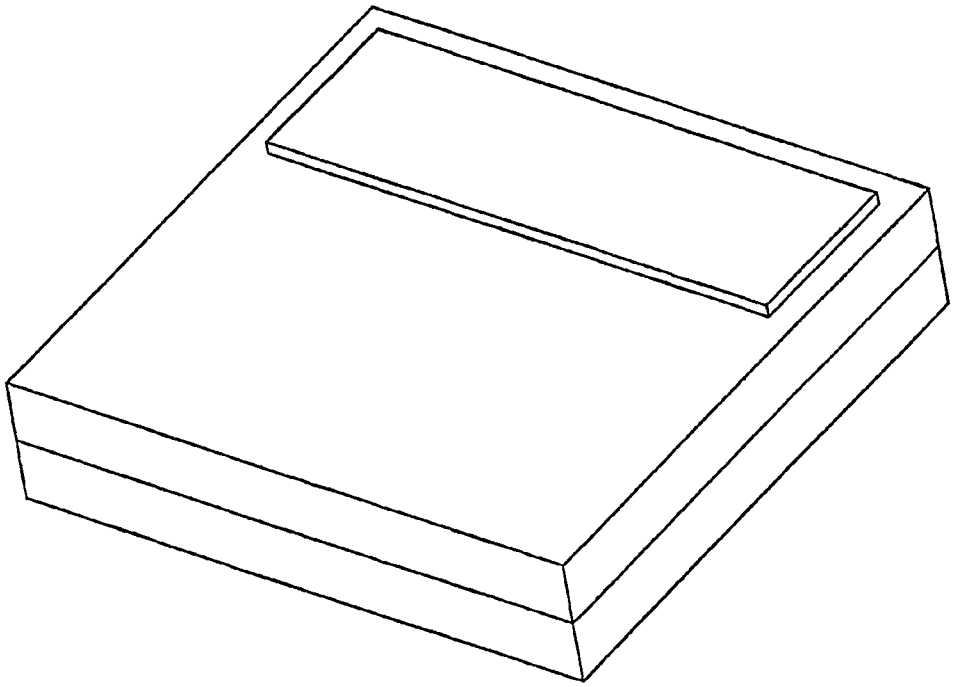

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D633,450 | S | * | 3/2011 | Fujihara et al. | D13/180 |
| D633,451 | S | * | 3/2011 | Fujihara et al. | D13/180 |
| D637,165 | S | * | 5/2011 | Kuzuoka | D13/180 |
| D638,380 | S | * | 5/2011 | Kuzuoka | D13/180 |
| D642,996 | S | * | 8/2011 | Miyake | D13/180 |
| D658,602 | S | * | 5/2012 | Egawa et al. | D13/180 |
| D664,506 | S | * | 7/2012 | Kuzuoka | D13/180 |
| D664,937 | S | * | 8/2012 | Kuzuoka | D13/180 |
| D673,921 | S | * | 1/2013 | Ozawa | D13/182 |
| D673,922 | S | * | 1/2013 | Moriai et al. | D13/182 |
| D683,634 | S | * | 6/2013 | Hayakawa et al. | D10/46 |
| D684,124 | S | * | 6/2013 | Matsuhisa et al. | D13/180 |
| D684,125 | S | * | 6/2013 | Kawachi et al. | D13/180 |
| D684,126 | S | * | 6/2013 | Kawachi et al. | D13/180 |
| D688,637 | S | * | 8/2013 | Matsuhisa et al. | D13/180 |
| D690,277 | S | * | 9/2013 | Matsuhisa et al. | D13/180 |
| D694,200 | S | * | 11/2013 | Matsuhisa et al. | D13/180 |
| 2001/0019245 | A1 | * | 9/2001 | Ohshita et al. | 313/506 |
| 2005/0168143 | A1 | * | 8/2005 | Kum et al. | 313/512 |
| 2006/0186520 | A1 | * | 8/2006 | Toba et al. | 257/678 |
| 2008/0200041 | A1 | * | 8/2008 | Lin et al. | 439/62 |
| 2009/0267526 | A1 | * | 10/2009 | Sung et al. | 315/169.3 |
| 2011/0248627 | A1 | * | 10/2011 | Fukano et al. | 313/504 |

* cited by examiner